Feb. 25, 1941.　　　J. C. SUTTON　　　2,232,830
BATHROOM SCALE
Filed March 28, 1935　　2 Sheets-Sheet 1
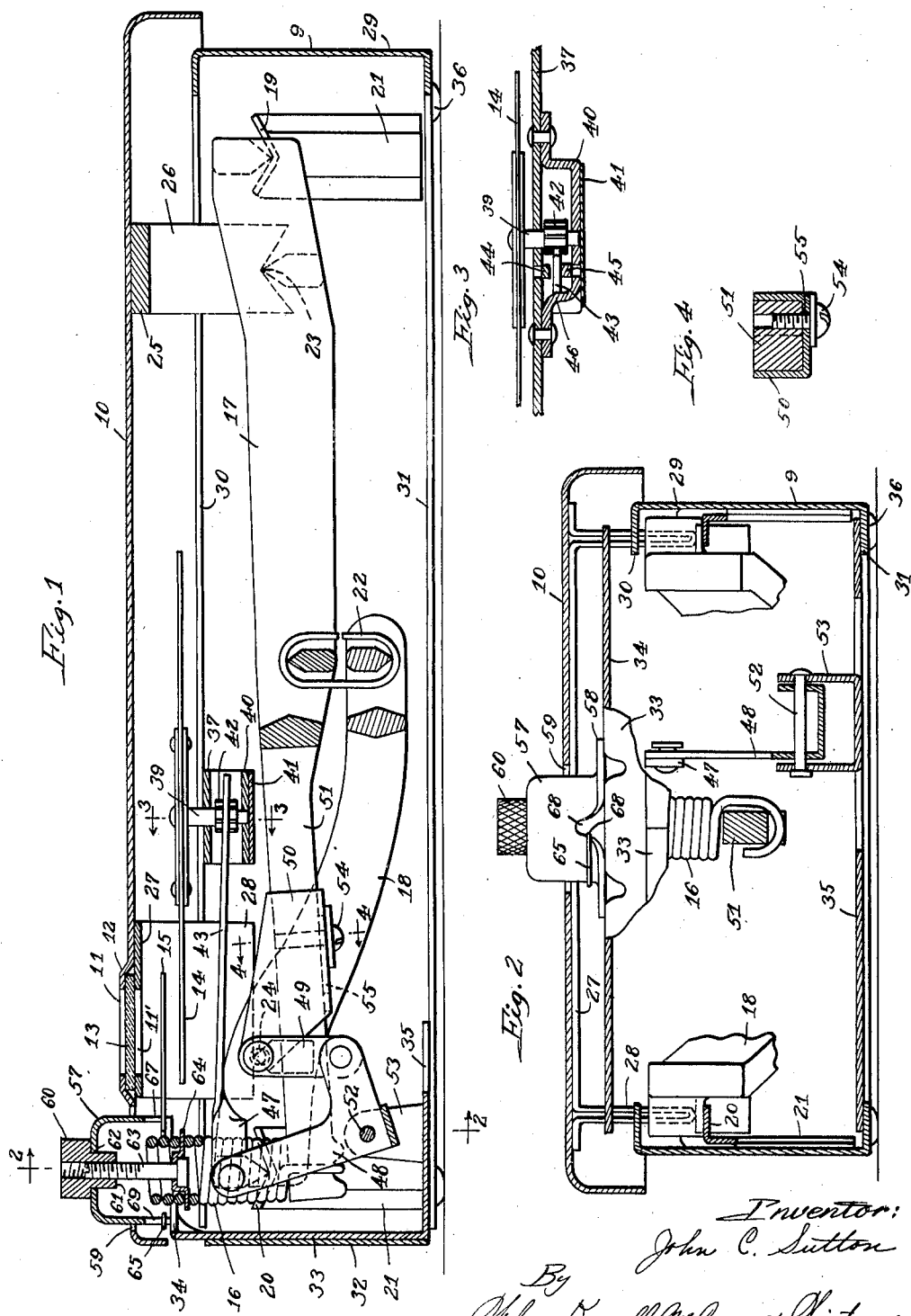
Inventor:
John C. Sutton
By
Wilson, Dowell, McCanna & Wintercorn
Attys.

Feb. 25, 1941.    J. C. SUTTON    2,232,830
BATHROOM SCALE
Filed March 28, 1935    2 Sheets-Sheet 2
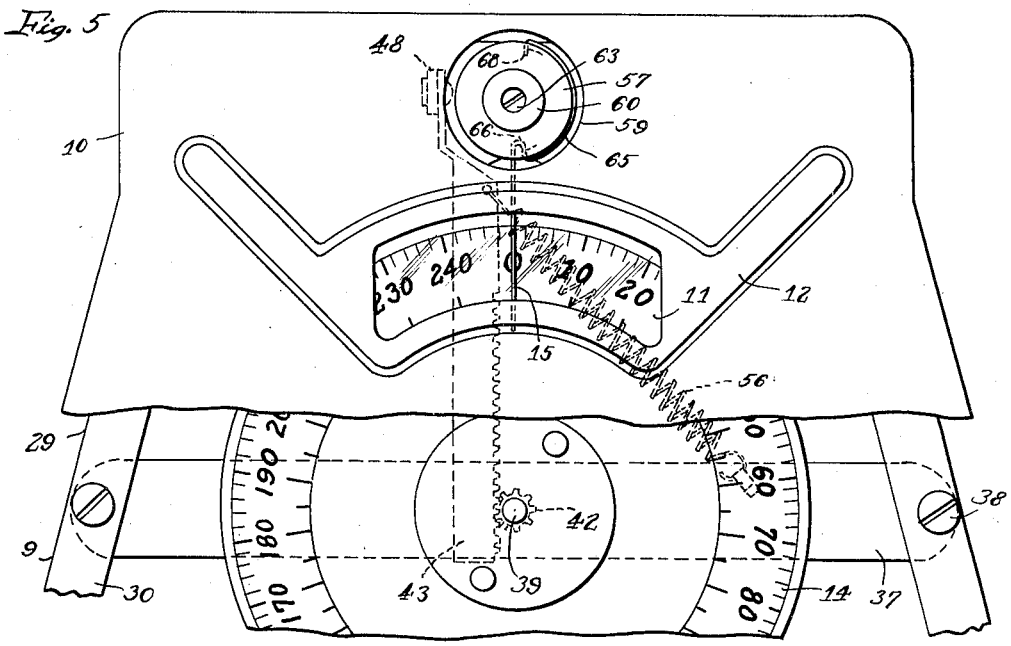
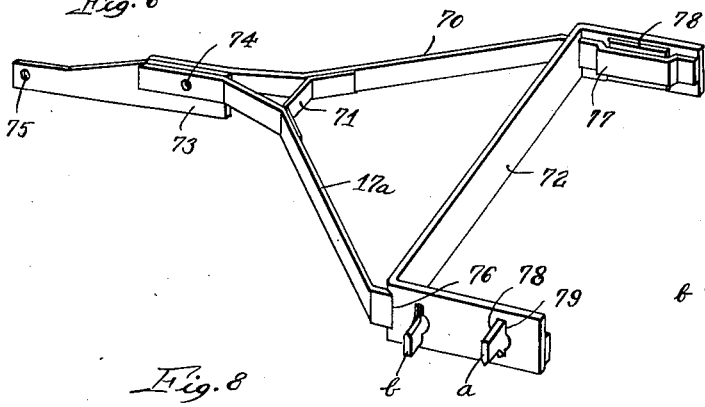
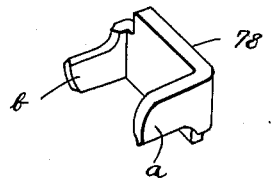
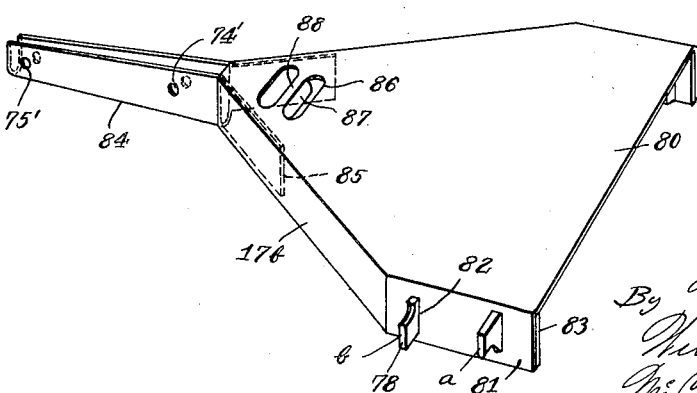

Patented Feb. 25, 1941

2,232,830

UNITED STATES PATENT OFFICE 2,232,830

BATHROOM SCALE

John C. Sutton, Rockford, Ill., assignor to The Brearley Company, Rockford, Ill., a corporation of Illinois Application March 28, 1935, Serial No. 13,395

18 Claims. (Cl. 265—68)

This invention relates to scales for weighing persons and is particularly concerned with improvements in that type known as bathroom scales.

The principal object of my invention is to provide a scale with a low platform, making it easier to step on and off the same, the scale being, furthermore, so constructed that the entire mechanism is housed compactly within a small base no larger than the platform itself, whereby to enable storage of the scale in any convenient place in a bathroom or other room in the home.

Another important object is to provide a rotary weight-indicating dial rotatable in a horizontal plane beneath and parallel to the platform and visible through a window therein.

Still another object consists in the provision of an improved base construction which, despite the shallowness of the structure, permits the use of the desired length of coiled spring vertically disposed and susceptible of adjustment as required.

Other objects are concerned with improvements in various other details of construction to which reference will be made in the following description referring to the accompanying drawings, wherein—

Figure 1 is a longitudinal section through a scale embodying my invention;

Fig. 2 is a cross-section on the line 2—2 of Figure 1 but showing parts at the middle upper portion of the view in front elevation;

Figs. 3 and 4 are sectional details on the correspondingly numbered lines of Figure 1;

Fig. 5 is a fragmentary plan view of the front end of the scale with the platform broken away to reveal the dial and its support thereneath;

Fig. 6 is a perspective of a wishbone lever of modified or alternative construction, Fig. 7 being a perspective on a larger scale of a part of one of the knife edge inserts used in the lever of Fig. 6, and Fig. 8 is a view similar to Fig. 6 showing still another lever construction.

Similar reference numerals are applied to corresponding parts throughout the views.

Referring first mainly to Figures 1, 2 and 5, 9 is the base and 10 the platform of the scale. The base 9 houses the entire scale mechanism therein within the area of the platform itself and, as will soon appear, the base is relatively shallow so that the platform 10 above it will be low enough to make it easy to step onto or off the same. An opening 11 in the V-shaped raised portion 12 of the platform has a transparent closure 13 therein to provide a window through which the rotary dial 14 and stationary pointer 15 are readily visible to a person standing on the platform. The dial is, of course, turned through an angularity proportionate to the weight of the person, his weight being counterbalanced as will soon appear by the stretching of the spring 16. The use of a rotating dial in conjunction with a stationary pointer makes it possible to provide coarse graduations for easier reading, the full 360° of the disk being provided with graduations, whereas, only a small window is required in the platform. The weight indicating dial and window therefor are provided in the front end of the scale so that the platform need only be wide enough to provide standing room and the person weighing himself can stand in a natural posture with his toes to either side of the window 11, and so as to read the indicated weight without leaning forward to such an extent as to affect the accuracy of the scale.

The scale mechanism, as should readily appear in Fig. 1, comprises two levers of wishbone form numbered 17 and 18 supported by their knife edge portions on seats 19 and 20, respectively, provided on small sheet metal brackets 21 welded to the side walls of the base 9. The form of these sheet metal brackets clearly appears in Figs. 1 and 2. The levers project toward each other and are linked together at the middle of the base, as at 22. Knife edges 23 on the two arms of the lever 17 form rear supports for the platform 10, and other knife edges 24 on the two arms of the lever 18 form front supports for said platform. A cross-bar 25 welded to the bottom of the platform has downwardly bent ends 26 notched to straddle the knife edges 23. A sheet metal strip 27 extends across the bottom of the platform 10 at the front end and at each end thereof is bent downwardly and upwardly to provide supporting legs 28 to rest upon the knife edges 24 for support of the platform. The strip 27 has an opening 11' punched therein to register with the window opening 11, and the transparent closure 13 is held in place between the strip 27 and the platform 10 in the raised portion 12. The use of sheet metal pieces stamped to shape and welded in place as just described obviously makes for economy and, at the same time, provides for the desired strength and durability.

The base 9 is in the form of a frame open at the top and bottom and made from two pieces of sheet metal, one of which, numbered 29, is bent to form the side and back walls of the base, which have inwardly bent top and bottom flanges 30 and 31 for greater strength and rigidity, the ends of the piece 29 being bent inwardly across the front of the base, as indicated at 32, and welded onto the other piece 33. The latter has inwardly bent flanges 34 and 35 at the top and bottom thereof, the flange 35 being welded on top of the flange 31. Small knobs 36 are pressed downwardly from the flange 31 to support the scale. The sheet metal construction of the base makes for lightness and cheapness without sacrificing strength and rigidity. Then, too, the scale is so designed that all of the loads are imposed at the extreme ends of the base where there is the greatest rigidity due to the vertical side walls disposed at right angles to one another, thus assuring minimum buckling of the sheet metal strip and securing greater accuracy of satisfactory indications. Thus, for example, the supports 21 are in the four corners of the base; the spring 16 is supported so that its loading is transmitted in a plane close to and parallel with the end wall 33, and the support for the lever 48, is as close to the end wall 33 as permissible.

The upper flange 30 of the base 9 forms a support for a cross-piece 37 on which the dial 14 is mounted, screws 38 being passed through the flange 30 and threaded into the ends of the piece 37, as shown in Fig. 5. The dial is carried on a short spindle 39 which passes through a hole in the cross-piece 37 into a hole in the bracket 40 riveted to the under side of the piece 37 and having a plate 41 welded to the bottom thereof to provide an end thrust bearing for the spindle. A pinion 42 on the spindle 39 meshes with a rack 43 movable in the deflection of the levers 17 and 18 under weight, whereby to rotate the dial 14 with respect to the pointer 15. Lugs 44 and 45 are punched downwardly and upwardly from the piece 37 and bracket 40, respectively, to provide rounded abutments between which the rack 43 will be guided for meshing engagement with the pinion 42. A similar lug 46 is struck from the side of the bracket 40 behind the rack 43 to prevent disengagement of the rack from the pinion. The rack 43 is stamped from a piece of sheet metal, the front end of which is bent at right angles into a vertical plane, as at 47, and pivoted to one arm of a bell crank lever 48, the other arm of which is pivotally connected by a link 49 with a bracket 50 fastened to the extension 51 of the lever 17. The extension 51 also has the lower end of the spring 16 hooked thereon, as clearly appears in Figure 1 so that the downward deflection of the levers 17 and 18 under the weight imposed on the platform 10 is resisted by the spring 16, and the extent of the deflection is indicated by the corresponding turning of the dial 14 by the rack 43. The lever 48, which, for the sake of economy is stamped from sheet metal to a U-shaped cross-section, is pivoted on a pin 52 supported at its opposite ends in lugs 53 punched up from the lower flange 35 of the base member 33. The screw 54 for fastening the bracket 50 to the extension 51 of the lever 17 extends through a longitudinal slot 55 in the bracket and this screw is not tightened until the bracket 50 has been adjusted forwardly or rearwardly enough to give the correct weight indication with the dial 14. The bracket 50, it will be observed in Fig. 4, is made U-shaped in cross-section so as to be slidable lengthwise of the extension 51 and permit fastening thereof rigidly in adjusted position with a single screw for simplicity and economy of construction. A light coiled tension spring 56 is attached at one end to the rack 43 near the point of its attachment to the bell crank lever 48 and extends rearwardly at an angle to the rack and is attached at its other end to the cross-piece 37, as clearly appears in Fig. 5. In this way, the spring has one component lengthwise of the rack 43 toward the pinion 42 to eliminate play in the various pivotal connections between the rack 43 and the levers 17—18, and another component in a transverse direction tending to urge the rack 43 into close meshing engagement with the pinion 42. In that way, accurate weight indications are produced even though cheap sheet metal construction is employed.

The weight counterbalancing spring 16 is vertically disposed in the front end of the scale and has its upper end extending through an opening in the flange 34 into a dome 57 formed of sheet metal and welded by its bottom flanges 58 onto the top of the flange 34. This dome projects upwardly through an opening 59 in the front end of the platform 10 and constitutes an elevated support for an adjusting nut 60 which has a reduced shank 61 extending through a center hole 62 in the top wall thereof. A screw or bolt 63 whose headed lower end is held against turning in a washer 64, screwed into the spring 16, has its threaded upper end threaded in the nut 60. The nut 60 is preferably knurled for operation by hand and is arranged to be adjusted to reset the scale to zero. The washer 64 is adjusted at the factory at the time the scale is assembled, so that the spring 16 will not be "too light" or "too heavy" but give exactly the correct weight indication by means of the dial 14. The dome 57 enables the use of a spring of the required length, vertically disposed, despite the lowness of the scale and the extreme compactness of design involved. This dome also is conveniently used as a support for the pointer 15 which, as appears in Figures 1, 2 and 3, is provided by the end of a wire clip 65 that extends around one side of the dome and has a loop 66 entered in a hole 67 in the rear wall of the dome and an inwardly bent end 68 entered in another hole 69 in the front wall of said dome.

In Fig. 6 I have shown a lever 17a of sheet metal construction, as distinguished from the cast levers shown in Figs. 1 and 2. This lever has two bent side members 70 which together form a wishbone braced, as at 71 and 72, and welded to another member 73 to provide the extension corresponding to the extension 51 of the lever 17. The brace 71 in this construction provides a place for the link connection 22 with the companion lever. The hole at 74 provides a place for attachment of a bracket similar to the bracket 50, and the hole at 75 provides a place for connecting the weight counterbalancing spring 16. The brace 72, it will be observed, is U-shaped and has holes 76 therein to receive the ends of the side members 70. Offsets 77 are formed in the ends of the side members to accommodate inserts 78, which are U-shaped and have the two arms thereof projecting through openings 79 in the ends of the brace 72. The one arm a of each insert has a downwardly facing knife edge to rest on the base, as at 19 (Figure 1), and the other arm b has an upwardly facing knife edge to support the platform thereon, as at 23 (Figure 1). The insert 78 will be of special steel with the knife edges properly formed thereon and when these pieces are properly hardened by heat treatment, it follows that the knife edges will last so much longer and result in more accurate weighing than where knife edges are simply cast integral with the levers and really do not have sharpened edges, the "knife edges" being in reality merely wedge shaped portions. The braces 71 and 72 are both preferably welded to the side members of the lever 17a, the inserts 78 being, of course, assembled on the lever beforehand.

Another lever construction is shown in Fig. 8, in which the lever 17b has the main body portion 80 formed by a sheet metal stamping, whose side flanges 81 form the supports for the inserts 78. The inserts have their knife edge portions a and b projecting through slots 82 in the flanges 81 and are retained by straps 83 welded onto the inside of said flanges. The extension is formed by a U-shaped sheet metal member 84 having diverging lugs 85 formed on the rear end thereof and fitting inside the front end of the body 80 and welded thereto. Holes 86 are punched in the top wall of the body 80 near the front end thereof and the metal from these holes is bent downwardly, as indicated at 87, to form a strong rigid web 88 between these holes into which one end of the link connection corresponding to the link 22 of Figure 1 may be attached. The holes at 74' and 75' in the extension 84 are provided for a similar purpose as the holes 74 and 75 in lever 17a.

It is believed the foregoing description conveys a good understanding of the objects and advantages of my invention. The appended claims have been drawn with a view to covering all legitimate modifications and adaptations.

I claim:

1. In a bathroom scale, a base, lever mechanism mounted therein, a platform having an aperture provided therein, said platform covering said base and being mounted on and movable with said lever mechanism, weight indicating means under the platform but visible from above the same through said aperture and operatively connected to said lever mechanism, a substantially vertical spring disposed mainly below the platform and connected to the lever mechanism resisting movement thereof, said platform having an opening provided therein through which the upper end of the spring protrudes, a hollow extension on top of said base projecting vertically through said opening and having the upper end of said spring received therein, a screw attached to the upper end of said spring, and a nut bearing on the upper end of said extension and threaded on said screw.

2. In a bathroom scale, a shallow base, lever mechanism mounted therein, a platform covering the base and mounted on and movable with said lever mechanism, a weight indicating dial supported on the base under the platform to turn on a substantially vertical axis and operatively connected to said lever mechanism, said platform having an opening provided therein near the front end thereof over said dial through which said dial is visible from above the platform, said platform having a second opening provided therein adjacent the dial opening, a substantially vertically disposed tension spring connected at its lower end to the lever mechanism to resist movement thereof, a dome projecting upwardly from the base through the second opening in the platform and enclosing the upper end of said spring, an adjusting nut bearing on top of said dome and threadedly connected with a screw within the dome attached to the upper end of said spring, and a weight indicating pointer extending substantially horizontally from said dome beneath said platform and visible through the first opening in the platform adjacent the periphery of said dial.

3. In a bathroom scale, a shallow base, lever mechanism mounted therein, a platform covering the base and mounted on and movable with said lever mechanism, a weight indicating dial supported on the base under the platform to turn on a substantially vertical axis and operatively connected to said lever mechanism, said platform having an opening provided therein near the front end thereof over said dial, said platform having a second opening provided therein adjacent the dial opening, a vertically disposed spring connected to the lever mechanism to resist movement thereof, a dome projecting upwardly from the base through the second opening in the platform and enclosing the upper end of said spring, an adjusting nut bearing on top of said dome and threadedly connected with a screw within the dome attached to the upper end of said spring, and a stationary pointer wire having a supporting end portion bent to extend around the dome and having diametrically opposed projections on said end portion detachably secured in diametrically opposed openings provided therefor in the side walls of said dome.

4. In a bathroom scale, a base, opposed wishbone levers fulcrumed on the base and interconnected at their crotch portions, spring means resisting movement of said levers, a dial rotatably mounted on said base on a vertical axis and operatively connected with said levers, a platform covering the base and arranged to be supported at its opposite ends on the spaced arms of said levers, said platform having a window opening provided therein in register with a portion of the aforesaid dial, a piece of transparent material covering said opening from beneath the platform, a front platform support fixed to the bottom of said platform so as to hold the piece of transparent material in place, said support having an opening provided therein registering with the opening in the platform, said support resting on the arms of one of said levers, and a rear support for the platform resting on the arms of the other lever.

5. In a weighing scale for the purpose described, an open sheet metal base frame comprising one piece of sheet metal formed to provide a substantially vertical end wall and substantially vertical side walls having inwardly bent horizontal top and bottom reinforcing flanges and another piece of sheet metal formed to provide the other substantially vertical end wall and secured to the adjacent ends of the side walls, said end wall having an inwardly bent horizontal bottom flange secured to the bottom flanges of the side walls, and an inwardly bent horizontal top flange, lever mechanism pivotally mounted on the side walls of said base near the end walls, a weighing platform supported on said levers and movable therewith relative to the base, a spring supported on the top flange of the last mentioned end wall and connected with the lever mechanism to resist movement thereof, and means for indicating the weight imposed on the platform including a rotary dial disposed for rotation on a vertical axis under said platform and operatively connected with the lever mechanism, a support for said dial extending crosswise of the base and secured at its opposite ends to the top flanges of the side walls, a thimble-like sheet metal dome mounted open end down on the top flange of said end wall, said flange having an opening therein and said spring extending through said opening into said dome, and an adjusting nut bearing on top of said dome and threaded on a screw attached to the upper end of said spring.

6. In a weighing scale for the purpose described, an open sheet metal base frame comprising one piece of sheet metal formed to provide a substantially vertical end wall and substantially vertical side walls having inwardly bent horizontal top and bottom reinforcing flanges and another piece of sheet metal formed to provide the other substantially vertical end wall and secured to the adjacent ends of the side walls, said end wall having an inwardly bent horizontal bottom flange secured to the bottom flanges of the side walls, lever mechanism pivotally mounted on the side walls of said base near the end walls, a weighing platform of sheet metal construction supported on the lever mechanism completely covering said base and having downwardly bent marginal flanges thereof for reinforcement and to enclose said base, a cross-member on said base secured at its opposite ends to the top flanges of said side walls, a rotary dial having a vertical spindles supported on said cross-member, said platform having an opening provided therein over the margin of said dial, means operatively connecting said dial with the lever mechanism, spring means for resisting movement of the lever mechanism, a closure of transparent material covering the opening in said platform from beneath, and supports for said platform secured to the bottom thereof and extending downwardly therefrom to the lever mechanism, one of said supports being disposed beneath the closure of transparent material holding the same in operative relation to the platform opening.

7. In a weighing scale, a base, lever mechanism mounted therein, a weighing platform covering said base and supported on the lever mechanism, spring means resisting movement of the lever mechanism, a rotary indicating dial arranged to be supported for rotation on a vertical axis on said base beneath said platform and having a vertical spindle with a pinion thereon, a rack operatively connected with said lever mechanism and meshing with said pinion to rotate the dial, and means for supporting said dial comprising a cross-member on the base providing one bearing for said spindle on one side of the pinion, a bracket member secured to the cross-member and extending on the other side of the pinion and providing another bearing for said spindle, a plate secured to one of said members and providing an end thrust bearing for said spindle, said rack extending between the bracket and cross-member and being slidably guided by portions thereof so as to be held in meshing engagement with the pinion.

8. A scale as set forth in claim 6, wherein the end wall of the base has an inwardly bent horizontal top flange, the scale including a thimble-like sheet metal dome mounted open end down on the top flange of said end wall, said flange having an opening therein and said spring extending through said opening into said dome, and an adjusting nut bearing on top of said dome and threaded on a screw attached to the upper end of said spring.

9. A scale as set forth in claim 6, wherein the end wall of the base has an inwardly bent horizontal top flange, the scale including a thimble-like sheet metal dome mounted open end down on the top flange of said end wall, said flange having an opening therein and said spring extending through said opening into said dome, and an adjusting nut bearing on top of said dome and threaded on a screw attached to the upper end of said spring, the scale platform having an opening provided in the end thereof for extension therethrough of said dome and also having a window provided therein over a marginal portion of the weight indicating dial.

10. In a weighing scale, an open sheet metal base frame providing substantially vertical side and end walls, the side walls having inwardly bent horizontal top reenforcing flanges, and one end wall having an inwardly bent horizontal top flange, lever mechanism pivotally mounted on the side walls of said base near the end walls, a weighing platform supported on said levers and movable therewith relative to the base, a spring supported on the top flange of the last mentioned end wall and connected with the lever mechanism to resist movement thereof, and means for indicating the weight imposed on the platform including a rotary dial disposed for rotation on a vertical axis under said platform and operatively connected with the lever mechanism, a support for said dial extending crosswise of the base and secured at its opposite ends to the top flanges of the side walls, a thimble-like sheet metal dome mounted open end down on the top flange of said end wall, said flange having an opening therein and said spring extending through said opening into said dome, and an adjusting nut bearing on top of said dome and threaded on a screw attached to the upper end of said spring.

11. In a weighing scale, an open sheet metal base frame providing substantially vertical side and end walls, lever mechanism comprising opposed wishbone levers pivotally mounted on the side walls of said base near the end walls and interconnected at their crotch portions, the rear lever having a forward extension, a weighing platform supported on the lever mechanism, a cross-member on said base secured at its opposite ends to said side walls, a rotary dial having a vertical spindle with a pinion thereon supported on said cross-member, said platform having an opening provided therein over the margin of said dial, a sheet metal housing on top of one of the end walls of the base projecting above the end of the platform, spring means connected with and resisting downward movement of the rear lever's forward extension and adjustable vertically relative to the top of said housing inside the same, a bell-crank lever pivotally mounted on the last-mentioned end wall beneath the housing and having one arm thereof pivotally connected with the rear lever's forward extension for oscillation in the movement thereof, and a rack member pivotally connected with the other arm of said bell-crank lever and extending substantially horizontally beneath the platform and meshing with the pinion of said dial.

12. In a weighing scale, an open sheet metal base frame providing substantially vertical side and end walls, the side walls having inwardly bent horizontal top reenforcing flanges, lever mechanism pivotally mounted on the side walls of said base near the end walls, a weighing platform of sheet metal construction supported on the lever mechanism completely covering said base and having downwardly bent marginal flanges for reenforcement thereof and to enclose said base, a cross-member on said base secured at its opposite ends to the top flanges of said side walls, a rotary dial having a vertical spindle supported on said cross-member, said platform having an opening provided therein over the margin of said dial, means operatively connecting said dial with the lever mechanism, spring means for resisting movement of the lever mechanism, a closure of transparent material covering the opening in said platform from beneath, and supports for said platform secured to the bottom thereof and extending downwardly therefrom to the lever mechanism, one of said supports being disposed beneath the closure of transparent material holding the same in operative relation to the platform opening.

13. In a weighing scale, an open sheet metal base frame providing substantially vertical side and end walls, the side walls having inwardly bent horizontal top reenforcing flanges, lever mechanism pivotally mounted on the side walls of said base near the end walls, a weighing platform of sheet metal construction supported on the lever mechanism completely covering said base and having downwardly bent marginal flanges for reenforcement thereof and to enclose said base, a cross-member on said base secured at its opposite ends to the top flanges of said side walls, a rotary dial having a vertical spindle supported on said cross-member, said platform having an opening provided therein over the margin of said dial, means operatively connecting said dial with the lever mechanism, spring means for resisting movement of the lever mechanism, the end wall of the base having an inwardly bent horizontal top flange, a thimble-like sheet metal dome mounted open end down on the top flange of said end wall, said flange having an opening therein and said spring extending through said opening into said dome, and an adjusting nut bearing on top of said dome and threaded on a screw attached to the upper end of said spring.

14. In a weighing scale, an open sheet metal base frame providing substantially vertical side and end walls, the side walls having inwardly bent horizontal top reenforcing flanges, lever mechanism pivotally mounted on the side walls of said base near the end walls, a weighing platform of sheet metal construction supported on the lever mechanism completely covering said base and having downwardly bent marginal flanges for reenforcement thereof and to enclose said base, a cross-member on said base secured at its opposite ends to the top flanges of said side walls, a rotary dial having a vertical spindle supported on said cross-member, said platform having an opening provided therein over the margin of said dial, means operatively connecting said dial with the lever mechanism, spring means for resisting movement of the lever mechanism, the end wall of the base having an inwardly bent horizontal top flange, a thimble-like sheet metal dome mounted open end down on the top flange of said end wall, said flange having an opening therein and said spring extending through said opening into said dome, and an adjusting nut bearing on top of said dome and threaded on a screw attached to the upper end of said spring, the scale platform having an opening provided in the end thereof for extension therethrough of said dome and also having a window provided therein over a marginal portion of the weight indicating dial.

15. In a weighing scale, an open sheet metal base frame providing substantially vertical side and end walls, lever mechanism comprising opposed wishbone levers pivotally mounted on the side walls of said base near the end walls and interconnected at their crotch portions, the rear lever having a forward extension, a weighing platform supported on the lever mechanism and movable therewith relative to the base, a cross-member on said base secured at its opposite ends to said side walls, a rotary dial having a vertical spindle with a pinion thereon supported on said cross-member, said platform having an opening provided therein over the margin of said dial, a sheet metal housing on top of one of the end walls of the base projecting above the end of the platform, spring means connected with and resisting downward movement of the rear lever's forward extension and adjustable vertically relative to the top of said housing inside the same, a bell-crank lever pivotally mounted on the last-mentioned end wall beneath the housing, a link pivotally connected with one arm thereof at one end and pivotally connected at its other end with a bracket adjustably mounted on the rear lever's forward extension for adjustment lengthwise with respect thereto, and a rack member pivotally connected with the other arm of said bell-crank lever and extending substantially horizontally beneath the platform and meshing with the pinion of said dial.

16. In a weighing scale, an open sheet metal base frame providing substantially vertical opposed side walls and an end wall, the side walls having inwardly bent horizontal top reenforcing flanges, a cross-member on said base secured at its opposite ends to the top flanges of said side walls, a rotary dial having a vertical spindle with a pinion thereon supported on said cross-member, lever mechanism pivotally mounted on the side walls of said base, a weighing platform supported on the lever mechanism and movable therewith relative to the base, said platform having an opening provided therein over at least a portion of said dial, a sheet metal end wall for the base frame opposite the other end wall and joined to the adjacent ends of the side walls, a sheet metal housing on top of said end wall projecting above the end of the platform, spring means connected with and resisting movement of the lever mechanism and adjustable vertically relative to the top of said housing inside the same, a stationary pointer projecting from said housing beneath the platform over said dial, a bell-crank lever pivotally mounted on the last-mentioned end wall beneath the housing and having one arm thereof pivotally connected with the lever mechanism for oscillation in the movement thereof, and a rack member pivotally connected with the other arm of said bell-crank lever and extending substantially horizontally beneath the platform and meshing with the pinion of said dial.

17. In a weighing scale, a base, lever mechanism mounted therein, a weighing platform covering said base and supported on the lever mechanism, spring means resisting movement of the lever mechanism, a rotary indicating dial arranged to be supported for rotation on a vertical axis on said base beneath said platform and having a vertical spindle with a pinion thereon, a rack operatively connected with said lever mechanism and meshing with said pinion to rotate the dial, and means for supporting said dial comprising a sheet metal cross-member on the base providing one bearing for said spindle on one side of the pinion, a sheet metal bracket member secured to the cross-member and extending on the other side of the pinion and providing another bearing for said spindle, a plate secured to one of said members and providing an end thrust bearing for said spindle, said bracket member and cross-member having narrow projections struck therefrom for slidable engagement with minimum frictional drag with the top, bottom, and edge of the rack to guide the same and keep it in meshing engagement with the pinion.

18. In a weighing scale for the purpose described, an open sheet metal base frame comprising one piece of sheet metal formed to provide a substantially vertical end wall and substantially vertical side walls having inwardly bent horizontal top and bottom reinforcing flanges, another piece of sheet metal at the other end of the base and joined to the adjacent ends of the side walls, a housing mounted open end down on top of said end wall, lever mechanism pivotally mounted on the side walls of said base, a weighing platform supported on said levers and movable therewith relative to the base, a spring connected with the lever mechanism to resist movement thereof and extending upwardly into said housing for adjustment by means of an adjusting nut bearing on top of said housing and threaded on a screw connected to the upper end of said spring, a rotary dial disposed for rotation on a vertical axis under said platform and operatively connected with the lever mechanism, and a support for said dial extending crosswise of the base under the platform and secured at its opposite ends to the top flanges of the side walls.

JOHN C. SUTTON.